United States Patent [19]

Blanc et al.

[11] Patent Number: 4,697,867
[45] Date of Patent: Oct. 6, 1987

[54] MULTI-DIRECTIONAL NON-IMAGING RADIATIONS CONCENTRATOR AND/OR DECONCENTRATOR DEVICE

[76] Inventors: Michel Blanc, 111, Bd Longchamp, 13001 Marseille; Jean Pollard, 27, rue du Parc á Foulons, 91120 Villebon sur Yvette; Gérard Marchand, Villa 57 les Bougainvillées Avenue Rampal, 13012 Marseille; René Henri, 7, Allée Pasteur, 13830 Rocquefort-la-Bedoule, all of France

[21] Appl. No.: 750,863

[22] Filed: Jul. 1, 1985

[30] Foreign Application Priority Data

Jun. 29, 1984 [FR] France .................................. 84 10386

[51] Int. Cl.$^4$ .............................................. G02B 6/00
[52] U.S. Cl. ................................ 350/96.10; 350/96.18; 350/438
[58] Field of Search ............... 350/96.10, 96.15, 96.18, 350/96.20, 96.24, 96.28, 96.30; 362/32; 250/227; 356/438, 439

[56] References Cited

U.S. PATENT DOCUMENTS

| | | | |
|---|---|---|---|
| 3,535,016 | 10/1970 | Malifaud et al. | 350/96.10 |
| 3,756,688 | 9/1973 | Hudson et al. | 350/96.10 |
| 4,076,378 | 2/1978 | Cole | 350/96.24 |
| 4,175,865 | 11/1979 | Horvath et al. | 356/439 X |
| 4,483,585 | 11/1984 | Takami | 350/96.18 X |
| 4,496,211 | 1/1985 | Daniel | 350/96.18 X |
| 4,533,210 | 8/1985 | Jesky | 350/96.30 |
| 4,576,435 | 3/1986 | Nishioka | 350/96.26 |

FOREIGN PATENT DOCUMENTS 3216439  3/1983  Fed. Rep. of Germany .

*Primary Examiner*—William L. Sikes
*Assistant Examiner*—Akm E. Ullah
*Attorney, Agent, or Firm*—Balogh, Osann, Kramer, Dvorak, Genova & Traub

[57] ABSTRACT

The device comprises an extension of a radiation conductor of constant cross-section, having a radiations-confining interface of truncated shape, of which the directrices and generatrices can be any type.

According to the invention, said device comprises at least a second radiations-confining interface of conical shape situated inside the first interface, the distance between these two radiations-confining interfaces being substantially constant, and said two interfaces facing in such a way that the radiations are confined between them and propagate towards or from the widened end of the interface opposite the conductor.

11 Claims, 7 Drawing Figures

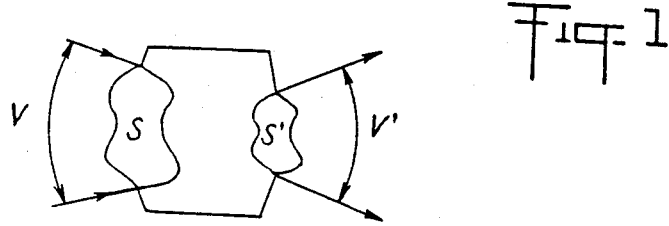
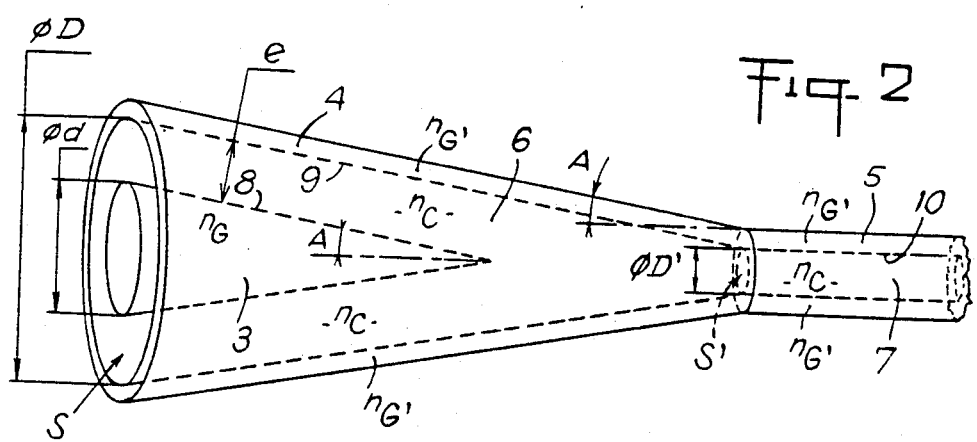
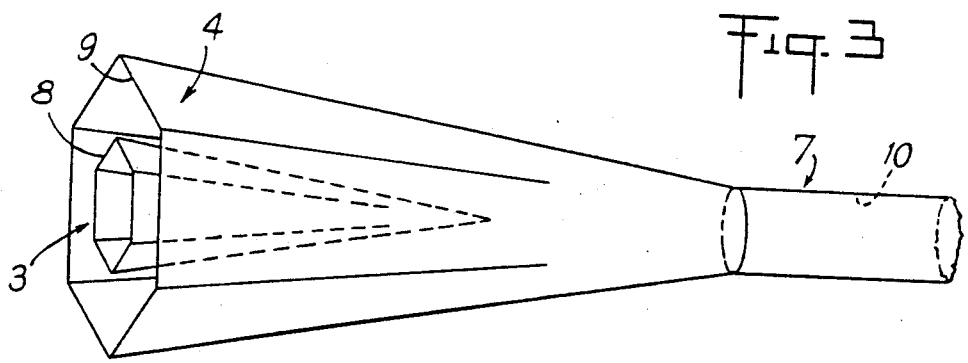

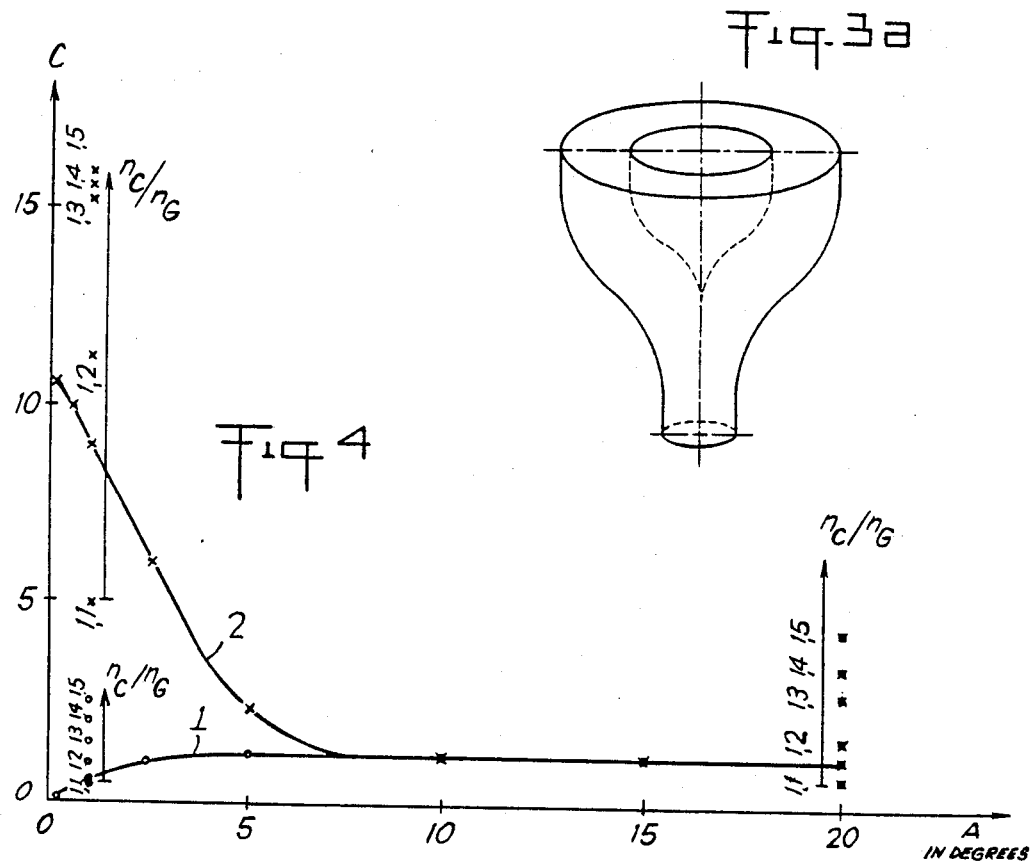
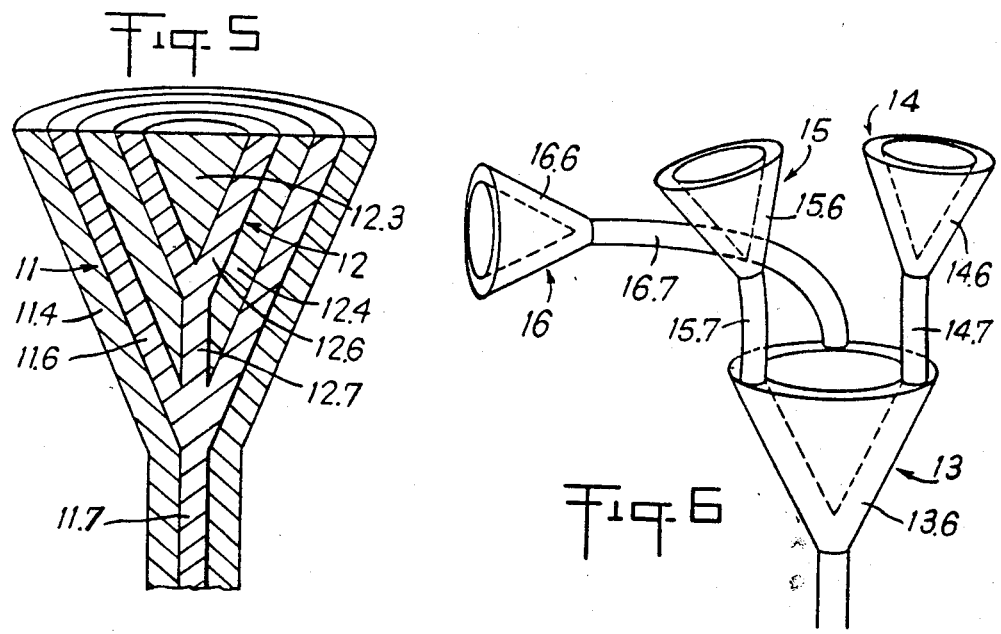

MULTI-DIRECTIONAL NON-IMAGING RADIATIONS CONCENTRATOR AND/OR DECONCENTRATOR DEVICE

SUMMARY OF INVENTION

The present invention relates to a multidirectional non-imaging radiations concentrator and/or deconcentrator device.

A radiations concentrator device is a system permitting the concentration, with preservation, of the energy radiated by a source on a given element; in other words, it is a system permitting the multiplication by a factor $C>1$ of the illumination obtained on said element from the source alone.

A radiations deconcentrator device is a system permitting the deconcentration, with preservation, of the energy radiated by a source on a given element; in other words, it is a system permitting the division by a factor $C>1$ of the illumination obtained on said element from the source alone.

Known concentrator devices are divided in two groups: imaging and non-imaging.

Imaging concentrator devices comprise lenses and mirrors, well known for a long time now, with which the image of the source is reproduced on a receiver of given shape and size.

It is possible with such devices to reach a high concentration (from just a few units to several thousands) depending on the collecting surface of the optical system and on the size of the image radiated by the source; in other words, depending on its aperture which is the ratio of its diameter to its focal length.

But the position of the image is tied to the position of the source with respect to the optical axis of the concentrator. The receiver having a finite hence limited dimension, this requires the concentrator to follow the source if the latter moves. In the case of diffuse radiation sources, concentration is poor, around 1. Finally, the image presents the same illumination topography as the source.

BACKGROUND OF INVENTION

The older non-imaging concentrator devices comprise either truncated axi-symmetrical cones of revolution with reflecting metallic shells, or truncated axi-symmetrical cones in glass. In both cases, the input area is greater than the output area, and the acceptance angle of the light rays at the input is smaller than the emergence angle at the output. Concentrators of the second type have been improved from the concentration standpoint, by replacing the truncated cone by a truncated axi-symmetrical paraboloid, and by combining in series truncated cones and truncated paraboloids, each element being constituted by a homogeneous and transparent block in a material having the same refraction index, but said index being able to vary from one element to another. Truncated cones constituted by layers of materials having indexes increasing from the input to the output, perpendicularly to the axis of the cone, have also been tried.

The illumination obtained in output is quasiuniform throughout the entire surface. The receiver can therefore be easily installed at the output of the concentrator.

But with these non-imaging concentrators, it is also necessary to follow the source if the latter moves, yet with less accuracy than in the preceding case.

The theoretical maximum concentration is given by the equation (CLAUSIUS principle):

$$C = (n' \sin U'/n \sin U)^2$$

in which n and n' are respectively, the refraction indices of the truncated cone (or truncated paraboloid) and of the output medium; U and U' are, respectively, the cone apex half angles, of acceptance in the truncated cones, and of emergence in the output medium.

Concentration is low and so is the acceptance angle. For example, for the truncated cone, concentration is about 2 for $n=1.5$ with a solid acceptance angle of about one sixth of a Steradian. The solid emergence angle, on the contrary, is high, nearly $2\pi$ Steradian in the air, this necessitating an adaptation of the indices of the truncated cone and of the receiver (immersion in a liquid).

To adjoin lenses at the input and at the output of a truncated cone (or truncated paraboloid) makes it possible to considerably increase concentration and to reduce the emergence angle, but reducing accordingly the acceptance angle, which is but a few hundredths of a Steradian (Malifaud 1964).

The aforementioned theoretical maximum concentrations are nowhere near what is obtained with these devices, as this pre-supposes the use of faultless components and a perfect alignment in the source direction.

It is the object of the present invention to regroup all the advantages of the two already existing systems mentioned hereinabove, leaving out all the disadvantages, and to reach a high concentration without any limitation of directivity.

And the invention proposes to this effect a multidirectional non-imaging radiations concentrator and/or deconcentrator device which comprises, like the known concentrator truncated cones with reflecting surface or transparent block, in extension of a radiation conductor of constant cross-section, a radiations-confining interface of truncated shape, of which the directrices and generatrices can be any type.

Moreover, U.S. Pat. No. 4,076,378 describes a device for transmitting image points of variable and controlled spacing. Said device comprises truncated fibers controlling with accuracy the input and output spacings between image points by stacking their thinner ends and their widened ends. Each fiber comprises three layers, of different refraction indices, decreasing from the center towards the periphery so that the light is reflected, in the thinner part of the length, onto the peripheral interface, and in the widened part of its length, onto the central interface of reduced cross-section, said central transmission zone being surrounded by an optically inactive zone extending between the two interfaces. This device is therefore a light transmitter working in two directions between the thinner end and the widened end, but without concentration or deconcentration of energy.

The concentrator and/or deconcentrator device according to the invention also uses two interfaces, but to confine the radiations differently and to propagate them indifferently in one direction or in the other, in order to obtain a concentration or deconcentration of energy, and in some cases, to obtain both simultaneously.

According to the invention, the device comprises at least a second radiations-confining interface of conical shape situated inside the first interface, the distance between these two radiations-confining interfaces being substantially constant, and said two interfaces facing in such a way that the radiations are confined between them and propagate towards or from the widened end of the interface opposite the conductor.

With such an improved device, it is possible to obtain a high acceptance angle, capable of reaching as much as the whole of the frontal half-space. This property makes it possible to concentrate the punctual sources (specific light source) as well as the diffuse sources (general ambient background light) and to use the concentrator in a readily choosable fixed position.

In addition, the illumination is uniform in output whatever the source or sources.

Also the concentration is high, theoretically unlimited for a given configuration since it is only dependent on the ratio of the input and output surfaces, or by placing several systems in series.

Such elementary structures with two confining interfaces may be coupled:

in parallel, the first interface of a structure being contiguous to the second interface of the structure surrounding it, and all first interfaces being connected with the same radiation conductor, or in series, the conductor of one being connected with the widened end of the other, or else, both in series and in parallel.

BRIEF DESCRIPTION OF THE DRAWINGS

The invention will be more readily understood on reading the following description with reference to the accompanying drawings in which:

FIG. 1 is a detailed diagram of the principle of the invention,

FIG. 2 is a perspective view illustrating a first embodiment of the device according to the invention, where transparent materials of different refraction indices are used, FIGS. 3 and 3A are perspective views illustrating a second embodiment of the invention and a variant of the device equipped with reflecting surfaces.

FIG. 4 is a graph showing the variation of the concentration C as a function of the half-angle A at the apex of the truncated cone, by way of two curves 1 and 2 on which the significant points are marked by small circles for a conventional truncated cone and respectively by small crosses for a device according to the invention, FIG. 5 is a diagram in half perspective, half cross-section of a parallel coupling of two elementary structures: cladding and inner core.

FIG. 6 is a view similar to FIG. 5 concerning a coupling in series of a collecting elementary structure with derived elementary structures.

DETAILED DESCRIPTION OF PREFERRED EMBODIMENT

The concentrator device described hereinafter is a passive optical element permitting to collect through a surface S the radiating energy from inside a solid angle V and to redistribute all or part of it through a surface S', inside a solid angle V' (FIG. 1). If $E_S$ and $E_{S'}$ are the respective illuminations of surfaces S and S', the concentration C is defined as being the ratio of $E_{S'}$ to $E_S$. The system is a concentrator if C is greater than 1. The system being passive, this obviously presupposes that the surface S' is smaller than the surface S.

Such a system can be used with X-rays in the same way as it can be used with microwaves (radar), even with U.V.s, visible, infrared radiations, the only condition being to use materials compatible with the selected spectral range of the radiations involved.

According to the embodiment illustrated in FIG. 2, the concentrator device essentially consists in a truncated axi-symmetrical system in transparent materials for the selected spectral range.

Said device comprises:

an inner core 3 of external diameter d, of half angle A at the apex and of refraction index $n_G$, ending into a point, a truncated peripheral cladding 4 of inner input diameter D, of inner output diameter D' (D' being smaller than D), of half angle A at the apex (the same half angle as that of the inner core, so that the generatrices of the inner surface of the cladding are parallel to those of the external surface of the core as long as said core is fitted co-axially inside the cladding), of refraction index $n_{G'}$, ending into a cylindrical tubular cladding 5 of same index.

a truncated tubular funnel 6 filling the space between the cladding 4 and the core 3, said funnel having a uniform thickness e and a refraction index $n_C$, said funnel being further extended by an optical conductor or fiber 7 of same refraction index which extends into said cladding 5.

Understandably, for radiations to propagate by total reflection onto interfaces 8 and 9 which are constituted by the external surface of the core 3 and the inner surface of the cladding 4, it is necessary that:

$$n_{external\ medium} \leq n_G < n_C$$

and $$n_{external\ medium} \leq n_{G'} < n_C$$

Said external medium being generally air, its index is equal to 1, and the core being generally constituted by the same material as the cladding, $n_G$ then is equal to $n_{G'}$.

In the above-defined case, total reflection is abrupt and takes place by "step index" from $n_C$ to $n_G$ and from $n_C$ to $n_{G'}$.

But the invention is also applicable to the case where total reflection proceeds by successive bendings and takes place then by "gradient index", acting on the material situated on the boundary between the interfaces so that its refraction index varies not abruptly, but rather following a certain progression.

Said total reflection applies not only to interfaces 8 and 9 of the device, but also to interface 10 of the radiations conductor which, according to the first example of embodiment, is constituted by optical fiber 7 cladded by cladding 5.

According to the second example of embodiment illustrated in FIG. 3, the concentrator device essentially consists in a truncated system, of which the widened part is hexagonal, the small end connected to the radiations conductor is circular and the generatrices are substantially straight, said system being formed of perfectly reflecting materials within the selected spectral range.

The resulting reflection is of the metallic type or of the interferential selective type through a judicious selection of thin layers deposited on the interface or interfaces.

In this second embodiment there can be found, the interface 8 of the core 3, the interface 9 of the cladding 4 and the interface 10 of the con-ductor or fiber 7.

Whatever the embodiment selected, any one at least of interfaces 8, 9 and 10 may be, for part of it only (length and/or periphery) of a certain type (refraction, metallic reflection, interferential selective reflection...) and for another part, of another type.

And also whatever the embodiment selected, the device, as elementary structure, comprises a cladding 4 of which the interface 9 is a conical surface with any type of directrices and generatrices, this property being also found in interface 8 of the core 3 which is substantially equidistant from said interface 9.

For example, the directrix may be circular (FIG. 2) oval, elliptic, square, rectangular, hexagonal (FIG. 3) or other; the generatrices may be straight (FIGS. 2 and 3), jagged, incurved. (FIG. 3A); the directrix may evolve in shape along the axis (FIG. 3) and the generatrices may adapt to this evolution by their shape and orientation.

This reflecting truncated concentrator device (FIGS. 1 and 2) combines the property of a truncated cone which is to pass from one to the other of its bordering surfaces, external and internal, with the property of the optical fiber which is to convey the rays without losses, through the medium of index $n_C$, by successive reflections on the interfaces 8 and 9, respectively of the mediums of index $n_C$ and $n_G$, $n_C$ and $n_{G'}$.

It is comparable to an original termination of an optical fiber, permitting the concentration of the energy inside the fiber or on the contrary, the deconcentration of said energy from said fiber.

Curves 1 and 2 of the graph shown in FIG. 4 illustrate the variation of the concentration C as a function of the half angle A at the apex of a conventional truncated cone (curve 1 at the significant points marked with a small circle) and of a device according to the invention (curve 2 with significant points marked with a small cross). For these two curves 1 and 2, $d=D/2$ and $D/D'=5$. The half angle A varies between 0° and 20°. The refraction indices are $n_C=1.6$ and $n_G=n_{G'}=1.4$, i.e. a ratio $n_C/n_G=1.143$, this giving a half angle at the apex of the acceptance cone of 51 degrees.

In the example illustrated by curves 1 and 2, it is found that for A greater than 7°, the conventional truncated cone and the device according to the invention give the same concentration D, around 1.2.

But for angles A smaller than 7°, the device according to the invention is found to be much better as it makes it possible to reach a concentration $C=10$ for an angle $A=30'$(½ degree), whereas with the conventional truncated cone, it is only possible, with the same angle, to reach 0.3.

Such concentrations are obtained for a uniform diffuse source covering the whole acceptance angle of the device.

This phenomenon is generalized and to check this, one should examine the resulting network of the curves, when the index ratio is caused to vary. For clarity's sake, this network is not shown in FIG. 4. But the significant points have been marked on the graph for values of A equal to 1° and 20°, the ratio $n_C/n_G$ being indicated for each of these points by portions of y-axes.

It is found that the device according to the invention and the conventional truncated cone are substantially equivalent for values of A greater than 5°. For example, at 2°30', it is possible with the device according to the invention to reach a concentration $C=16$ for a ratio $n_C/n_G=1.3$ this giving a half angle at the apex of the acceptance cone of 56°.

The concentration value may be optimized for every couple of indices by altering the values of ratios d/D and S/S'.

With infrared, a device having a funnel in germanium ($nC=4$) immersed in air ($nG=1$) gives, for an angle $A=2°30'$ and a ratio $d/D=5.8$, a concentration of around 15.

It is obvious that the concentrator device as an elementary structure, is that illustrated in FIG. 2 or in FIG. 3. But this device may be more complex and be constituted by a plurality of elementary structures.

According to the embodiment diagrammatically illustrated in FIG. 5, two elementary structures 11 and 12 are mounted in parallel. In this case, the funnel 11.6 of the structure 11 which is extended by the optical fiber 11.7 is interposed between the cladding 11.4 of said structure and its core forming the cladding 12.4 of the co-axial structure 12; the filling 12.6 of said structure 12 integral with an extension 12.7 of the fiber 11.7 is interposed between said cladding core 12.4 and the core 12.3 of said structure 12.

In other words, the first confining interface 9 of the structure 12 is contiguous to the second confining interface 8 of the structure around it, all first interfaces being joined to the interface 10 of the radiations conductor 7.

It is understood that a plurality of elementary structures may be mounted in parallel by co-axial interlocking, all of which structures defining a co-axial common optical fiber.

According to the embodiment diagrammatically illustrated in FIG. 6, the device comprises an elementary collector structure 13, on the funnel 13.6 of which are mounted, in series, optical fibers 14.7, 15.7, 16.7... funnels 14.6, 15.6, 16.6..., a plurality of deriYed elementary structures 14, 15, 16..., each one of which can cooperate with other derived structures.

The device according to the invention, whether elementary or complex, is comparable to an original termination of an optical fiber, permitting the concentration of the energy inside the fiber, or on the contrary, the deconcentration thereof, depending on whether the radiation flux penetrates through the widened end of the device or through the conductor respectively; it is possible in some cases, to simultaneously combine the two functions for example for lighting a surface and at the same time, for collecting the energy reflected by said surface. Therefore, said device must be considered as radiat-ions- concentrator and/or deconcentrator.

The device according to the invention is applicable to a great number of industrial fields, such as the following:

visualization: transmission, enlargement or reduction of natural or synthetic images, flat display panels, . . .

lighting: pick-up, collection, transmission, deflection, :oncentration, mixing of light energy at different wavelengths for illumination of surfaces or volumes from punctual or diffuse sources. . .

energetics: pick-up, collection, concentration, transmission of radiating energy, even if diffused, for local use or transformation. . . For example solar heating (even by shaded sun) use of silicon solar cells under high concentration, . . .

instrumentation: collection of very low level energy, spectroscopy, astronomy, . . .

opto-electronics: interface-components for data transmission optical fibers (connections, light signal injection, coupling, . . .).

microwaves: micro-wave concentrators, . . .

What we claim is:

1. A multidirectional non-imaging device for optimizing concentration and/or deconcentration of radiations and for use as an extension of a radiation conductor of constant cross-section, comprsing:
   a first means for forming a first radiation confining tapered surface having a truncated shape and being disposed with its narrow end adjacent an end of said radiation conductor and having directrices of any closed type and having generatrices of any form consistent with said tapered surface;
   a second means forming at least one second radiation confining tapered surface inscribed within said first surface means; and
   a radiation transparent medium between said first and second surface means, with the spacing between said first and second surface means being substantially constant to enable radiations confined therebetween to propagate toward and/or away from the widened end of the device.

2. A device as claimed in claim 1, wherein the surface of at least one of said first or second interfaces is at least partly of the metallic reflection type.

3. A device as claimed in claim 1, wherein the surface of at least one of said first or second interfaces is at least partly of the total reflection by refraction type.

4. A device as claimed in claim 1, wherein the surface of at least one of said first or second interfaces is at least partly of the interferential selective reflection type.

5. A device as claimed in claim 3, wherein at least one of said first or second interfaces is of the "step index" type.

6. A device as claimed in claim 3, wherein at least one of said first or second interfaces is of the "gradient index" type.

7. A device as claimed in claim 1, wherein said second interface is disposed within said first interface and is spaced apart from said radiation conductor.

8. A device as claimed in claim 1, wherein at least one of said interfaces is, over at least a part of its surface, of the total refraction index type, and a material disposed between said first and said second interfaces and having a refraction index that is higher than the refraction indices of the materials disposed outside of said first and said second interfaces.

9. An arrangement comprsing a plurality of devices as defined in claim 1, wherein each individual device is interconnected in parallel, said first interface of one device being contiguous to the said second interface of another device surrounding said one device, with interfaces of all devices having a common connection to the same radiation conductor.

10. An arrangement comprising a plurality of devices as claimed in claim 1, wherein each individual device is interconnected with another individual device in series, the radiation conductor of one device being connected to the widened end of an adjacent device.

11. An arrangement as claimed in claim 10, wherein the two interfaces of each device are connected in parallel on the widened end of one common device with two interfaces.

* * * * *